(12) United States Patent
King et al.

(10) Patent No.: US 11,133,537 B2
(45) Date of Patent: Sep. 28, 2021

(54) PERFORMING TEMPERATURE CONTROL ON A LITHIUM BATTERY OF A VEHICLE

(71) Applicant: Textron, Inc., Providence, RI (US)

(72) Inventors: Russell William King, Evans, GA (US); Michael Folger Grosso, Summerville, SC (US)

(73) Assignee: Textron Inc., Providence, RI (US)

( * ) Notice: Subject to any disclaimer, the term of this patent is extended or adjusted under 35 U.S.C. 154(b) by 262 days.

(21) Appl. No.: 16/237,067

(22) Filed: Dec. 31, 2018

(65) Prior Publication Data

US 2020/0212515 A1 Jul. 2, 2020

(51) Int. Cl.
| | |
|---|---|
| *H01M 10/48* | (2006.01) |
| *H01M 10/0525* | (2010.01) |
| *H01M 10/613* | (2014.01) |
| *H01M 10/617* | (2014.01) |
| *B60L 58/26* | (2019.01) |
| *B60L 58/27* | (2019.01) |
| *H01M 10/615* | (2014.01) |

(52) U.S. Cl.
CPC ........... *H01M 10/486* (2013.01); *B60L 58/26* (2019.02); *B60L 58/27* (2019.02); *H01M 10/0525* (2013.01); *H01M 10/613* (2015.04); *H01M 10/615* (2015.04); *H01M 10/617* (2015.04); *B60L 2200/22* (2013.01)

(58) Field of Classification Search
None
See application file for complete search history.

(56) References Cited

U.S. PATENT DOCUMENTS

| | | |
|---|---|---|
| 5,934,051 A | 8/1999 | Hahn |
| 6,885,535 B2 | 4/2005 | Hummert et al. |
| | (Continued) | |

FOREIGN PATENT DOCUMENTS

| | | |
|---|---|---|
| EP | 1655830 A1 | 5/2006 |
| WO | 20130006949 A1 | 1/2013 |

OTHER PUBLICATIONS

Garia, "Introducing the New Garia Golf", http://www.garia.com/news/introducing-the-new-garia-golf/, Sep. 15, 2016.

*Primary Examiner* — Wyatt P McConnell
(74) *Attorney, Agent, or Firm* — BainwoodHuang

(57) ABSTRACT

A technique is performed on a vehicle having a lithium battery and a temperature control apparatus. The technique involves receiving a temperature reading from temperature sensing circuitry. The technique further involves performing a comparison operation that compares the temperature reading from the temperature sensing circuitry to a target temperature range. The technique further involves, in response to a result of the comparison operation indicating that the temperature reading is outside the target temperature range, automatically providing electric power from an external battery charger to the temperature control apparatus of the vehicle. The external battery charger is distinct and separate from the vehicle. Additionally, the temperature control apparatus adjusts the temperature of the lithium battery of the vehicle in response to the electric power automatically provided from the external battery charger (e.g., heating or cooling the lithium battery to improve battery capacity and preserve battery life).

19 Claims, 6 Drawing Sheets

(56) References Cited

U.S. PATENT DOCUMENTS

| | | | |
|---|---|---|---|
| 7,332,881 B2 | 2/2008 | Clark et al. | |
| 7,560,882 B2 | 7/2009 | Clark et al. | |
| 7,683,570 B2 | 3/2010 | Krauer et al. | |
| 7,778,746 B2 | 8/2010 | McLeod et al. | |
| 7,800,345 B2 | 9/2010 | Yun et al. | |
| 7,825,616 B2 | 11/2010 | Clark et al. | |
| D652,349 S | 1/2012 | Kristensen | |
| 8,120,291 B2 | 2/2012 | Clark et al. | |
| 8,596,391 B2 | 12/2013 | Kshatriya | |
| 8,604,749 B2 | 12/2013 | Kwag et al. | |
| 8,714,572 B1 | 5/2014 | Singletary et al. | |
| 9,050,899 B2 | 6/2015 | Seol | |
| 9,190,782 B2 | 11/2015 | King et al. | |
| 9,199,546 B2 | 12/2015 | King | |
| 9,225,183 B2 | 12/2015 | King | |
| 9,371,067 B2 | 6/2016 | Dao et al. | |
| 9,387,775 B2 | 7/2016 | Baek et al. | |
| 9,436,261 B2 | 9/2016 | Yun | |
| 9,508,982 B2 | 11/2016 | Kim et al. | |
| 9,553,460 B2 | 1/2017 | Dao et al. | |
| 9,592,743 B2 | 3/2017 | Haug | |
| 9,595,847 B2 | 3/2017 | Dao et al. | |
| 9,806,341 B2 | 10/2017 | Lee et al. | |
| 9,806,545 B2 | 10/2017 | Fink | |
| 10,059,167 B2 | 8/2018 | Rustoni | |
| 2002/0030405 A1 | 3/2002 | Hamer et al. | |
| 2008/0099603 A1 | 5/2008 | Yamamoto et al. | |
| 2013/0241502 A1 | 9/2013 | Sowden | |
| 2017/0072813 A1* | 3/2017 | Martin | H01M 10/486 |
| 2017/0182897 A1 | 6/2017 | Wang | |
| 2017/0190335 A1 | 7/2017 | Gillett | |
| 2017/0267105 A1 | 9/2017 | Fratelli | |
| 2018/0345816 A1* | 12/2018 | Sakakibara | B60L 11/1875 |
| 2019/0319472 A1 | 10/2019 | Lebreux | |

* cited by examiner

PERFORMING TEMPERATURE CONTROL ON A LITHIUM BATTERY OF A VEHICLE

BACKGROUND

A conventional electric utility vehicle such as an electric golf car operates using electric power from a lithium ion battery. During operation, the lithium ion battery provides electric power to an electric motor which turns the tires to move the electric utility vehicle.

The lithium ion battery of the electric utility vehicle may be routinely recharged. For example, the lithium ion battery may receive regenerative charging from the electric motor as the electric utility vehicle coasts downhill. Additionally, the lithium ion battery may receive charge from an external power source (e.g., from a wall outlet or street power).

SUMMARY

Improved techniques are directed to performing temperature control on a lithium battery of a vehicle. In particular, a temperature control apparatus which is in thermal communication with the lithium battery receives electric power from an external battery charger to adjust the temperature of the lithium battery when the ambient temperature is outside a target temperature range (e.g., when the ambient temperature is suboptimal). Accordingly, when a user later initiates operation of the vehicle, the temperature of the lithium battery will have been adjusted from the ambient temperature to a better suited temperature. Along these lines, in a cold temperature environment, the temperature of the lithium battery may be raised (e.g., using an electric heater powered by the external battery charger) so that performance of the lithium battery is not diminished and the user is able to operate the vehicle with greater battery capacity. Additionally, in a high temperature environment, the temperature of the lithium battery may be lowered (e.g., using cooling circuitry powered by the external battery charger) to preserve the life of the lithium battery.

It should be understood that the techniques disclosed herein discuss performing temperature control of a lithium battery of a utility vehicle by way of example only. However, it should be appreciated that the techniques may be applied to other types of apparatus such as electric automobiles, hybrid vehicles, aircraft, watercraft, unmanned vehicles, battery powered equipment, and so on.

One embodiment is directed to a method which is performed on a utility vehicle having a lithium battery and a temperature control apparatus. The method includes receiving a temperature reading from temperature sensing circuitry. The method further includes performing a comparison operation that compares the temperature reading from the temperature sensing circuitry to a target temperature range. The method further includes, in response to a result of the comparison operation indicating that the temperature reading is outside the target temperature range, automatically providing electric power from an external battery charger to the temperature control apparatus of the utility vehicle. The external battery charger is distinct and separate from the utility vehicle. Additionally, the temperature control apparatus adjusts the temperature of the lithium battery of the utility vehicle in response to the electric power automatically provided from the external battery charger. Accordingly, the lithium battery may be heated or cooled to a temperature that provides better battery capacity and that preserves battery life) In some arrangements, the external battery charger includes a converter which is interconnected between an external power source and the temperature control apparatus of the utility vehicle. Additionally, automatically providing the electric power from the external battery charger to the temperature control apparatus of the utility vehicle includes, while the converter converts a first power signal from the external power source to a second power signal, delivering the second power signal from the converter to the temperature control apparatus of the utility vehicle.

In some arrangements, the method further includes delivering the second power signal from the converter to the lithium battery of the utility vehicle to recharge the lithium battery. Accordingly, in these arrangements, the converter supplies power to both the temperature control apparatus to modify battery temperature as well as the lithium battery itself to recharge the lithium battery.

In some arrangements, delivering the second power signal from the converter to the temperature control apparatus of the utility vehicle includes, after the delivery of the second power signal from the converter to the lithium battery of the utility vehicle has been terminated in response to the lithium battery reaching a target state of charge, supplying the second power signal from the converter to the temperature control apparatus of the utility vehicle to modify the temperature of the lithium battery. In these arrangements, temperature control may continue even though charging of the lithium battery has terminated.

In some arrangements, delivering the second power signal from the converter to the temperature control apparatus of the utility vehicle further includes, during the delivery of the second power signal from the converter to the lithium battery of the utility vehicle in response to the lithium battery approaching the target state of charge, supplying the second power signal from the converter to the temperature control apparatus of the utility vehicle to modify the temperature of the lithium battery. In these arrangements, temperature control and charging of the lithium battery are able to occur simultaneously.

In some arrangements, the temperature sensing circuitry includes a battery charger sensor of the external battery charger. Additionally, receiving the temperature reading from the temperature sensing circuitry includes acquiring a sensor signal from the battery charger sensor, the sensor signal identifying, as the temperature reading, an ambient temperature of the external battery charger.

In some arrangements, the temperature sensing circuitry includes a vehicle sensor of the utility vehicle. Additionally, receiving the temperature reading from the temperature sensing circuitry includes acquiring a sensor signal from the vehicle sensor, the sensor signal identifying, as the temperature reading, an ambient temperature of the utility vehicle.

In some arrangements, the temperature sensing circuitry includes cell sensing circuitry of the lithium battery. Additionally, receiving the temperature reading from the temperature sensing circuitry includes acquiring a sensor signal from the cell sensing circuitry of the lithium battery, the sensor signal identifying, as the temperature reading, cell temperature of the lithium battery.

In some arrangements, the temperature sensing circuitry further includes external sensing circuitry which is distinct and separate from the lithium battery (e.g., a battery charger sensor of the external battery charger, a vehicle sensor of the utility vehicle, a different sensor, combinations thereof, etc.). Additionally, the method further includes, prior to acquiring the sensor signal from the cell sensing circuitry of the lithium battery, (i) acquiring a temperature measurement from the external sensing circuitry and (ii) in response to the temperature measurement being outside a predefined threshold of the target temperature range, transitioning the converter of the external battery charger from an inactive state in which the converter does not convert the first power signal from the external power source to the second power signal to an active state in which the converter converts the first power signal from the external power source to the second power signal.

In some arrangements, the temperature control apparatus includes an electric heater, and the result of the comparison operation indicates that the temperature reading is lower than the target temperature range. Additionally, delivering the second power signal from the converter to the temperature control apparatus of the utility vehicle includes, in response to the result of the comparison operation indicating that the temperature reading is lower than the target temperature range, supplying the second power signal to the electric heater to provide heat to the lithium battery.

In some arrangements, the temperature control apparatus includes an electric cooling circuit, and the result of the comparison operation indicates that the temperature reading is higher than the target temperature range. Additionally, delivering the second power signal from the converter to the temperature control apparatus of the utility vehicle includes, in response to the result of the comparison operation indicating that the temperature reading is higher than the target temperature range, supplying the second power signal to the electric cooling circuit to cool the lithium battery.

In some arrangements, the temperature control apparatus includes heating and cooling circuitry, and the result of the comparison operation indicates that the temperature reading is lower than the target temperature range. Additionally, the method includes, in response to the result of the comparison operation indicating that the temperature reading is lower than the target temperature range, providing a control signal to the heating and cooling circuitry that directs the heating and cooling circuitry to provide heat to the lithium battery. Furthermore, the method includes, in response to the result of the comparison operation indicating that the temperature reading is higher than the target temperature range, providing a control signal to the heating and cooling circuitry that directs the heating and cooling circuitry to cool the lithium battery.

In some arrangements, the external battery charger includes a control circuit that is powered by the external power source. Additionally, performing the comparison operation that compares the temperature reading from the temperature sensing circuitry to the target temperature range includes generating, by the control circuit of the external battery charger, the result indicating that the temperature reading is outside the target temperature range.

In some arrangements, the utility vehicle includes a control circuit that is powered by the external power source. Additionally, performing the comparison operation that compares the temperature reading from the temperature sensing circuitry to the target temperature range includes generating, by the control circuit of the utility vehicle, the result indicating that the temperature reading is outside the target temperature range.

Another embodiment is directed to a utility vehicle which includes a utility vehicle body, a set of electrical loads supported by the utility vehicle body, a lithium battery which is supported by the utility vehicle body and which is constructed and arranged to electrically power the set of electrical loads, a temperature control apparatus thermally coupled to the lithium battery, and a controller electrically coupled to the temperature control apparatus. The controller is constructed and arranged to:

(A) obtain a temperature reading,
(B) perform a comparison operation that compares the temperature reading to a target temperature range, and
(C) in response to a result of the comparison operation indicating that the temperature reading is outside the target temperature range, automatically provide electric power from an external battery charger to the temperature control apparatus, the external battery charger being distinct and separate from the utility vehicle, and the temperature control apparatus adjusting the temperature of the lithium battery in response to the electric power automatically provided from the external battery charger.

In some arrangements, the controller is further constructed and arranged to connect the lithium battery to the external battery charger to recharge the lithium battery. Here, the controller may form part of the circuitry that also controls electrical access to the lithium battery.

Yet another embodiment is directed to a battery charger that charges a lithium battery of a utility vehicle. The battery charger includes a converter constructed and arranged to convert a first power signal from an external power source to a second power signal which is suitable for charging the lithium battery of the utility vehicle, a set of cables constructed and arranged to connect to the utility vehicle, and a control circuit coupled to the converter. The control circuit is constructed and arranged to:

(A) obtain a temperature reading,
(B) perform a comparison operation that compares the temperature reading to a target temperature range, and
(C) in response to a result of the comparison operation indicating that the temperature reading is outside the target temperature range, automatically provide the second power signal from the converter to a temperature control apparatus of the utility vehicle through the set of cables, the battery charger being distinct and separate from the utility vehicle, and the temperature control apparatus adjusting the temperature of the lithium battery in response to the second power signal automatically provided from the converter.

Other embodiments are directed to higher and lower level systems, assemblies, apparatus, processing circuits, etc. Some embodiments are directed to various processes, electronic components and circuitry which are involved in performing temperature control on a lithium battery of a vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing temperature control on a lithium battery of a vehicle. In particular, a temperature control apparatus which is in thermal communication with the lithium battery receives electric power from an external battery charger to adjust the temperature of the lithium battery when the ambient temperature is outside a target temperature range (e.g., when the ambient temperature is suboptimal). Accordingly, when a user subsequently initiates operation of the vehicle, the temperature of the lithium battery will have been adjusted from the ambient temperature to a more suitable temperature that improves battery capacity and preserves battery life. Along these lines, in a cold temperature environment, the temperature of the lithium battery may be raised (e.g., using an electric heater powered by the external battery charger) so that performance of the lithium battery is not diminished and the user is able to operate the vehicle with greater battery capacity. Additionally, in a high temperature environment, the temperature of the lithium battery may be lowered (e.g., using cooling circuitry powered by the external battery charger) to preserve the life of the lithium battery.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
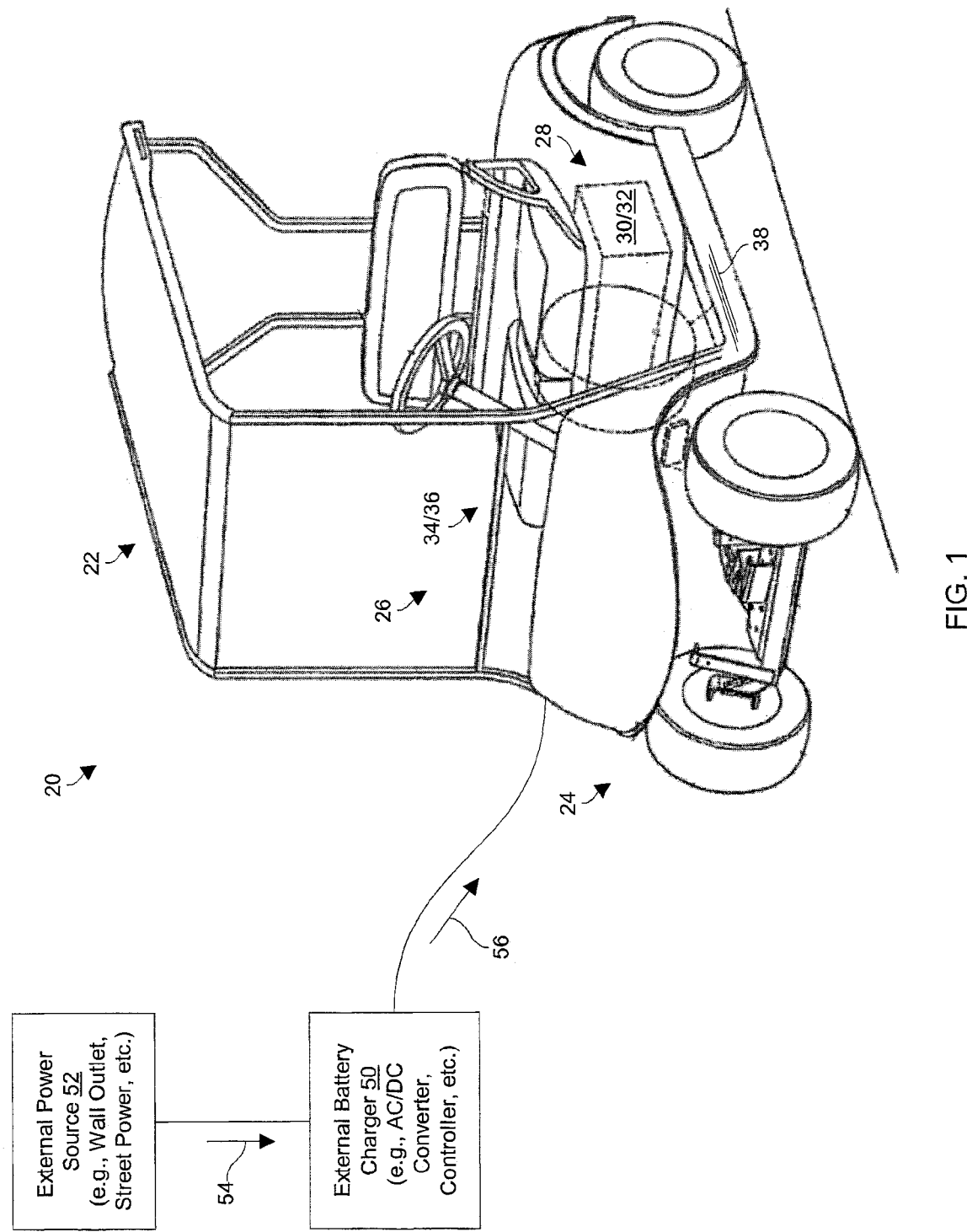
FIG. 1 is a perspective view of an environment in which temperature control is performed on a lithium battery of a vehicle.

FIG. 1 shows an environment in which temperature control is performed on a lithium battery of a vehicle 20. The vehicle 20 includes, among other things, a vehicle body 22 (e.g., a chassis, a frame, etc.), a set of tires (or wheels) 24, a motion control system 26, and a temperature control apparatus 28. It should be understood that the vehicle 20 has the form factor of a utility vehicle such as a golf car by way of example only and that other types of craft and/or form factors are suitable for use such as electric automobiles, hybrid vehicles, personal transport vehicles, food and beverage vehicles, hospitality vehicles, all-terrain vehicles (ATVs), utility task vehicles (UTVs), motorcycles, scooters, electric or hybrid vehicles for specialized applications, and so on.

In certain golf car embodiments for the vehicle 20, such as that illustrated by way of example in FIG. 1, the golf car may include an operator seating area covered by a canopy supported by a plurality of struts. The golf car may further comprise a rear bag well area disposed rearward of the operator seating area and configured to carry one or more golf bags and/or other cargo. In some embodiments, the rear bag well area may support a rear facing seat for carrying additional passengers and/or a convertible rear seat kit configured to convert to a cargo deck for carrying cargo.

The motion control system 26 controls vehicle movement such as drive provided by the set of tires 24, speed control, braking, and so on thus enabling the vehicle 20 to perform useful work. The motion control system 26 of the illustrated embodiments includes, among other things, a motor system 30, a rechargeable battery system 32, and additional components 34 such as a set of user controls 36 (e.g., a foot pedal, a keyed switch, a maintenance switch, etc.) and cabling 38.

During operation, the vehicle 20 runs on electric power from the rechargeable battery system 32 which includes a lithium battery. In particular, the lithium battery of the rechargeable battery system 32 supplies electric power to the motor system 30 thus enabling the vehicle 20 to transport passengers and/or cargo from one location to another. Additionally, the lithium battery may supply electric power to other electrical equipment to perform other functions (e.g., refrigeration, robotics, illumination, combinations thereof, etc.).

At some point, an external battery charger 50 may be connected to the vehicle 20 to recharge the lithium battery of the rechargeable battery system 32. In particular, the external battery charger 50 may interconnect between an external power source 52 (e.g., a wall outlet, a power feed from the street, etc.) and the vehicle 20. In accordance with certain embodiments, the external battery charger 50 includes a converter which converts an input signal 54 (e.g., an AC power signal provided by the external power source 52) into an output signal 56 (e.g., a DC power signal provided to the vehicle 20) which is better suited for charging the lithium battery.

While the vehicle 20 remains connected to the external battery charger 50, the vehicle 20 may access electric power from the external battery charger 50 to operate the temperature control apparatus 28 which is constructed and arranged to adjust the temperature of the lithium battery depending on the current ambient temperature. In accordance with certain embodiments, the temperature control apparatus 28 may raise the temperature of the lithium battery so that performance of the lithium battery is not diminished and the user is able to operate the vehicle with greater battery capacity. In accordance with other embodiments, the temperature control apparatus 28 may lower the temperature of the lithium battery to preserve the life of the lithium battery. In accordance with yet other embodiments, temperature control apparatus 28 may selectively raise and lower the temperature of the lithium battery as needed.

In some arrangements, powering the temperature control apparatus 28 is independent of whether the external battery charger 50 is charging the lithium battery. For example, the rechargeable battery system 32 may open its contactor to disconnect the lithium battery from the external battery charger 50, but the temperature control apparatus 28 may still access a power signal from the external battery charger 50 while the contactor is open. Such opening of the contactor ensures that parasitic loads will not unnecessarily drain the lithium battery if the external battery charger 50 is disconnected from the vehicle 20. Further details will now be provided with reference to FIG. 2.

Figure 2:
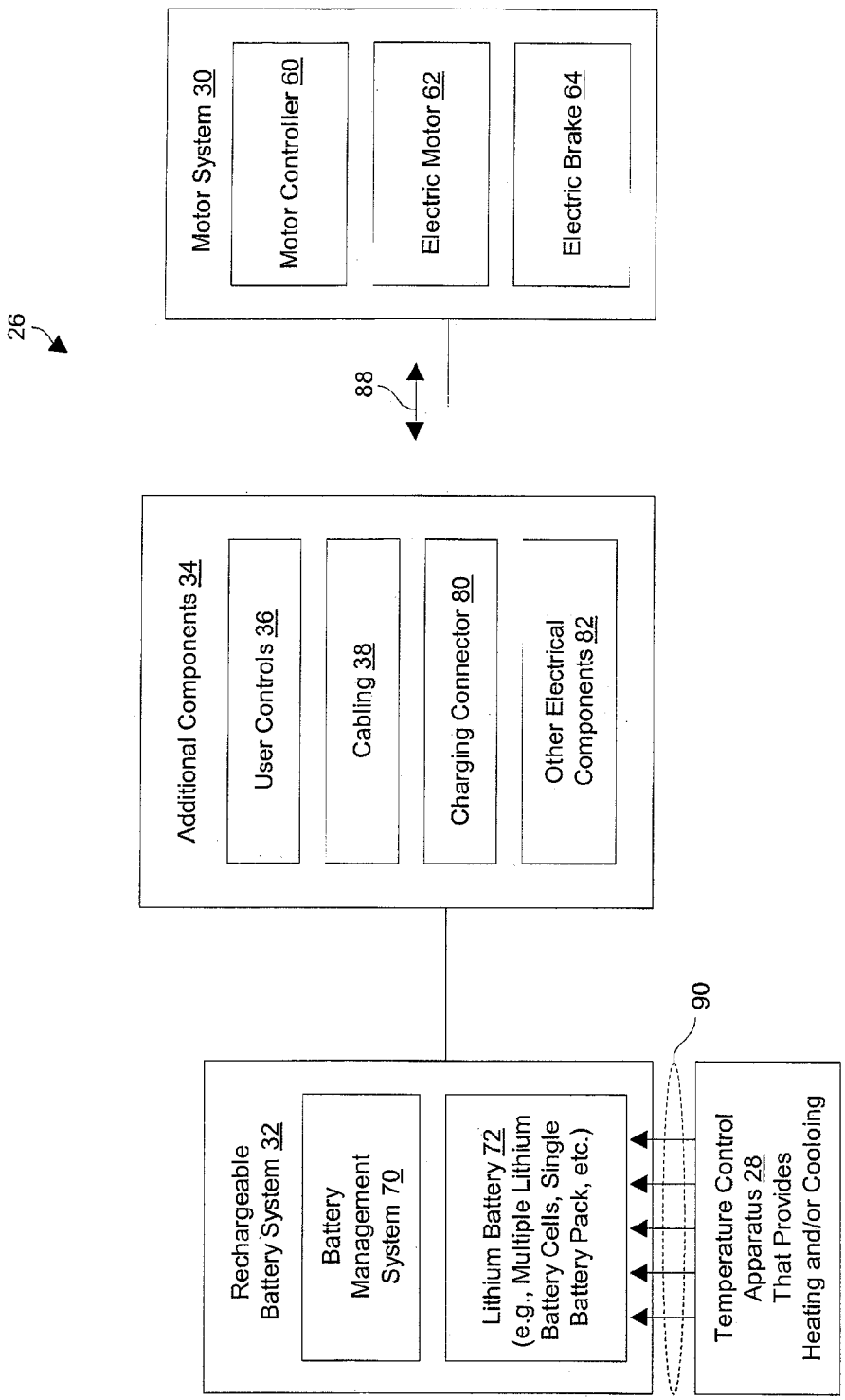
FIG. 2 is a block diagram of particular circuitry of the vehicle of FIG. 1.

FIG. 2 shows particular details of the motion control system 26 and the temperature control apparatus 28 of the vehicle 20 (also see FIG. 1) in accordance with certain embodiments. As shown in FIG. 2, the motor system 30 of the motion control system 26 includes a motor controller 60, an electric motor 62 which is linked to the set of tires 24 (FIG. 1), and an electric brake 64 coupled with the electric motor 62. The motor controller 60 controls delivery of stored electric power from the rechargeable battery system 32 to the electric motor 62 which ultimately turns at least some of the tires 24 to move the vehicle 20. Additionally, in some arrangements, the motor controller 60 controls delivery of regenerative power from the electric motor 62 to recharge the rechargeable battery system 32 (e.g., during braking, while the vehicle 20 coasts downhill without any pedal depression, etc.).

Not all embodiments include an electric brake 64. However, in certain embodiments, the electric brake 64 is constructed and arranged to provide mechanical resistance which inhibits turning of the electric motor 62 when the electric brake 64 is unpowered, and remove the mechanical resistance to release the electric motor 62 thus allowing the electric motor 62 to turn when the electric brake 64 receives power. Accordingly, when the vehicle 20 sits idle (i.e., the vehicle 20 is awake but a user is not pressing on the accelerator pedal, the vehicle 20 is turned off, etc.), the electric brake 64 remains engaged and the vehicle 20 sits in a parked state.

The rechargeable battery system 32 includes a battery management system (BMS) 70 and a rechargeable lithium battery 72. The BMS 70 controls electrical access to the lithium battery 72. Additionally, the BMS 70 of some embodiments responds to various events such as sleep events (e.g., timeouts) to prevent excessive discharging of the lithium battery 72 thus safeguarding the lithium battery 72 from becoming over discharged. In some embodiments, the BMS 70 responds to other events as well such as wakeup events (e.g., actuation of the user controls 36), charging situations, fault conditions, and so on to properly and safely control charging and discharging of the lithium battery 72.

It should be understood that a variety of form factors are suitable for the lithium battery 72. For example, the lithium battery 72 may include multiple rechargeable lithium battery cells, a single battery pack, combinations thereof, and so on.

The additional components 34 may, for example, include the earlier-mentioned set of user controls 36 (e.g., pedals, switches, etc.), the earlier-mentioned cabling 38, a charging connector 80, and perhaps other electrical components 82 (e.g., lights, a global positioning system (GPS), a smart mobile device, specialized equipment, etc.). In some arrangements, the cabling 38 includes a communications bus, such as, for example, a controller area network (CAN) bus through which the motor system 30 and the rechargeable battery system 32 exchange communications 88 such as electronic CAN messages in accordance with the CAN protocol.

A utility vehicle having a motion control system which is similar to that mentioned above is described in U.S. Pat. No. 10,017,169, the contents and teachings of which are hereby incorporated by reference in their entirety.

As further shown in FIG. 2, the temperature control apparatus 28 is in thermal communication with the lithium battery 72 of the rechargeable battery system 32. In particular, as illustrated by the arrows 90 in FIG. 2, the temperature control apparatus 28 is able to impart a temperature change to the lithium battery 72 (e.g., provide heat, provide cooling, provide both, etc.). A variety of thermal conducting mechanisms may be utilized such as thermal conducting metals, manifolds, fluids/gels, heat pipes, integration of the temperature control apparatus 28 with the lithium battery 72, combinations thereof, etc. Accordingly, the lithium battery 72 may avoid operating in suboptimal temperatures but instead be moved to an improved temperature that provides better charge/discharge rates, battery capacity, battery life, and so on. Further details will now be provided with reference to FIG. 3.

Figure 3:
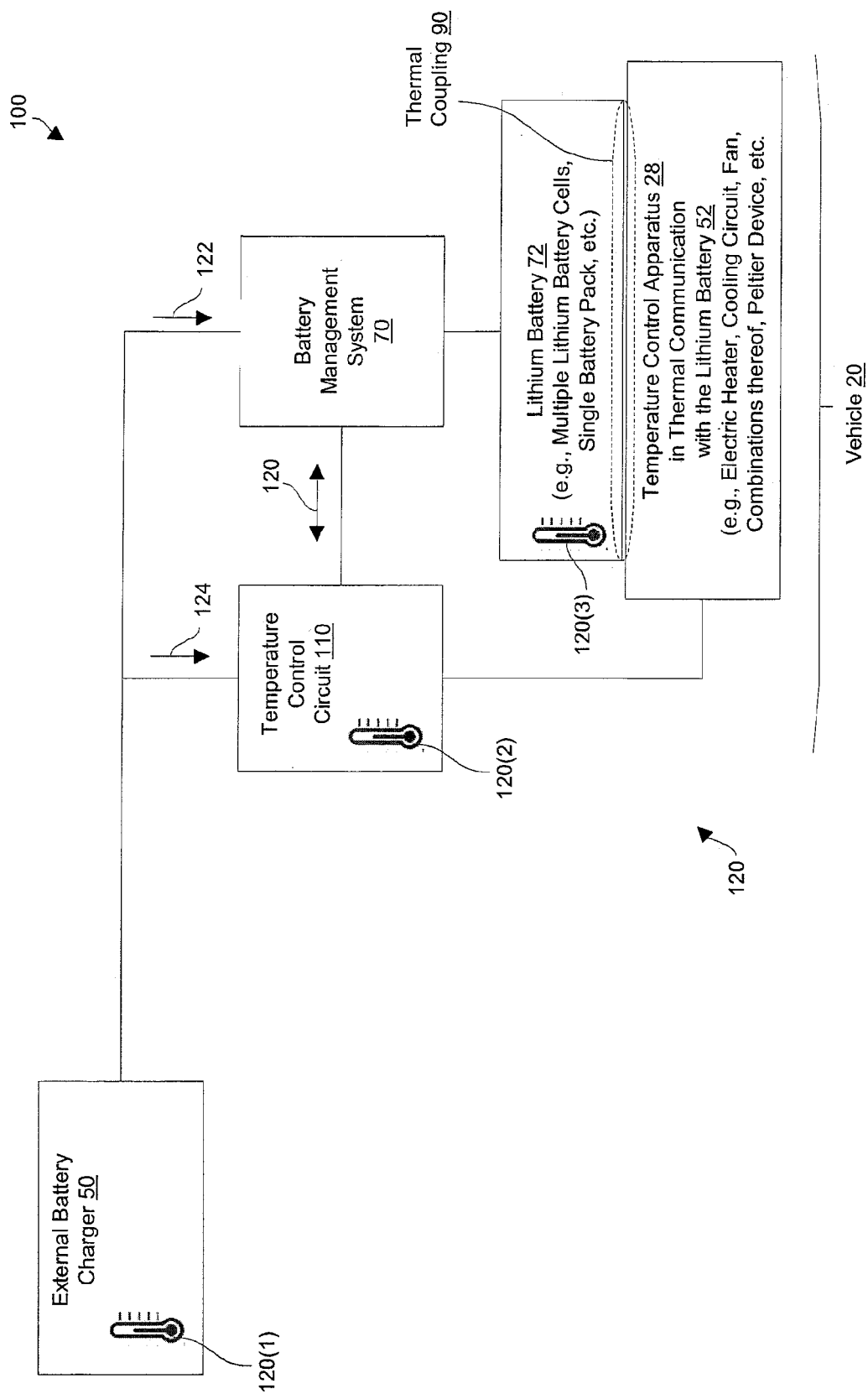
FIG. 3 is a general block diagram illustrating suitable locations for particular components that perform temperature control in accordance with some example embodiments.

FIG. 3 shows a general topology 100 for particular components which may be involved in performing temperature control on the lithium battery 72 of the vehicle 20.

The general topology 100 includes the external battery charger 50, the BMS 70, the lithium battery 72, the temperature control apparatus 28, and a temperature control circuit 110 (also see FIGS. 1 and 2). In some arrangements, the BMS 70 and the temperature control circuit 110 communicate with each other via electronic signals 120 (e.g., CAN messages over a CAN bus). Furthermore, the adjacency and dashed area 90 represents the earlier-mentioned thermal coupling between the lithium battery 72 and the temperature control apparatus 28.

As mentioned earlier, the external battery charger 50 is constructed and arranged to provide the vehicle 20 with electric power to recharge the lithium battery 72. Such operation may commence when control circuitry within the external battery charger 50 activates an internal power converter. The arrow 122 represents electric power from the external battery charger 50 for battery charging, wakeup, etc. Similarly, the arrow 124 represents electric power from the external battery charger 50 for operating circuitry of the vehicle 20 which provides heating and/or cooling of the lithium battery 72.

Additionally, as illustrated by the thermometer symbols, there are a variety of different sensor locations 120 that are well suited for obtaining temperature readings. Along these lines, a battery charger sensor 120(1) (e.g., a temperature sensor which is part of the external battery charger 50) is capable of measuring ambient temperature around the vehicle 20 (i.e., the current temperature within a predefined distance of the vehicle 20 such as 5 feet, 10 feet, 15 feet, and so on) since the external battery charger 50 is adjacent/proximate to or is in the immediate vicinity of the vehicle 20. Likewise, a vehicle sensor 120(2) (e.g., a temperature sensor which is part of the temperature control circuit 110) is capable of measuring the ambient temperature around the vehicle 20. Furthermore, cell sensing circuitry 120(3) (e.g., temperature sensing circuitry integrated within or attached to the lithium battery 72) is capable of measuring cell temperature of the lithium battery 72. Other temperature sensing locations 120 are suitable for use as well (e.g., a temperature sensor which is separate from the vehicle 20 and the external battery charger 50, but next to or alongside the vehicle 20, etc.).

It should be understood that, while the external battery charge 50 is connected to the vehicle 20, specialized circuitry receives a temperature reading from a sensor at one of the sensor locations 120 to determine whether the lithium battery 72 is currently at a target temperature range. In particular, such specialized circuitry compares the temperature reading to the target temperature range. If the temperature reading falls within the target temperature range, the lithium battery 72 is considered to be at a proper operating temperature that provides healthy performance (e.g., good charge capacity, etc.) and that does not unnecessarily shorten the life of the lithium battery 72. In such an optimal temperature situation, the specialized circuitry does not operate the temperature control apparatus 28 and the temperature of the lithium battery 72 is not adjusted.

However, if the temperature reading is outside the target temperature range (i.e., above or below the target temperature range), the lithium battery 72 is considered to be at a suboptimal operating temperature. In this situation, the specialized circuitry operates the temperature control apparatus 28 to move the temperature of the lithium battery 72 into the target temperature range.

It should be understood that the operation of the specialized circuitry may be based on multiple (or continuous) temperature readings from one or more locations 120. For example, the initial temperature reading may originate from one of the sensors 120(1), 120(2). Then, if the specialized circuitry activates the temperature control apparatus 28 to adjust the temperature of the lithium battery 72, the specialized circuitry may receive, as feedback, subsequent temperature readings from the sensing circuitry 120(3) integrated within the lithium battery 72. In some arrangements, the specialized circuitry samples temperature from the same cell sensing circuitry utilized by the BMS 70 (FIG. 2) to monitor lithium battery health and detect fault situations while the BMS 70 is awake.

In some arrangements, the specialized circuitry deactivates the temperature control apparatus 28 once the specialized circuitry determines that the temperature of the lithium battery 72 is within a predefined threshold of the target temperature range. For example, the predefined threshold may be within the target temperature range by 2%, 3%, 5%, etc. In these arrangements, the specialized circuitry may reactivate the temperature control apparatus 28 if one or more subsequent temperature readings strays out of the target temperature range.

In other arrangements, the specialized circuitry continues to operate the temperature control apparatus 28 even after the specialized circuitry determines that the temperature of the lithium battery 72 is within the predefined threshold of the target temperature range. For example, the specialized circuitry may continue to move the temperature of the lithium battery 72 to a particular point within the target temperature range such as the center point, 30% into the range, 40% into the range, 60% into the range, etc. Once the temperature of the lithium battery 72 reaches the particular temperature point, the specialized circuitry continues to operate the temperature control apparatus 28 to hold the temperature at that point.

Example low ends of the target temperature range include 10 degrees Celsius, 5 degrees Celsius, 0 degrees Celsius, −4 degrees Celsius, and so on. At temperatures below the low end of the target temperature range, the performance of the lithium battery 72 may be considered unacceptable in terms of discharge rate, charge rate, etc.

Example high ends of the target temperature range include 45 degrees Celsius, 50 degrees Celsius, 55 degrees Celsius, and so on. At temperatures above the high end of the target temperature range, the service life (or cycle life) of the lithium battery 72 may be considered significantly reduced during battery use.

Other temperature ranges (i.e., different low endpoints and/or high endpoints) are suitable for use as well. Additionally, different thresholds may be put in place before triggering deactivation, reactivation, etc. of the temperature control apparatus 28. In some arrangements, certain thresholds and/or tolerances are adjusted to prevent unnecessary bounce situations, race conditions, etc. Further details will now be provided with reference to FIGS. 4 and 5.

Figure 4:
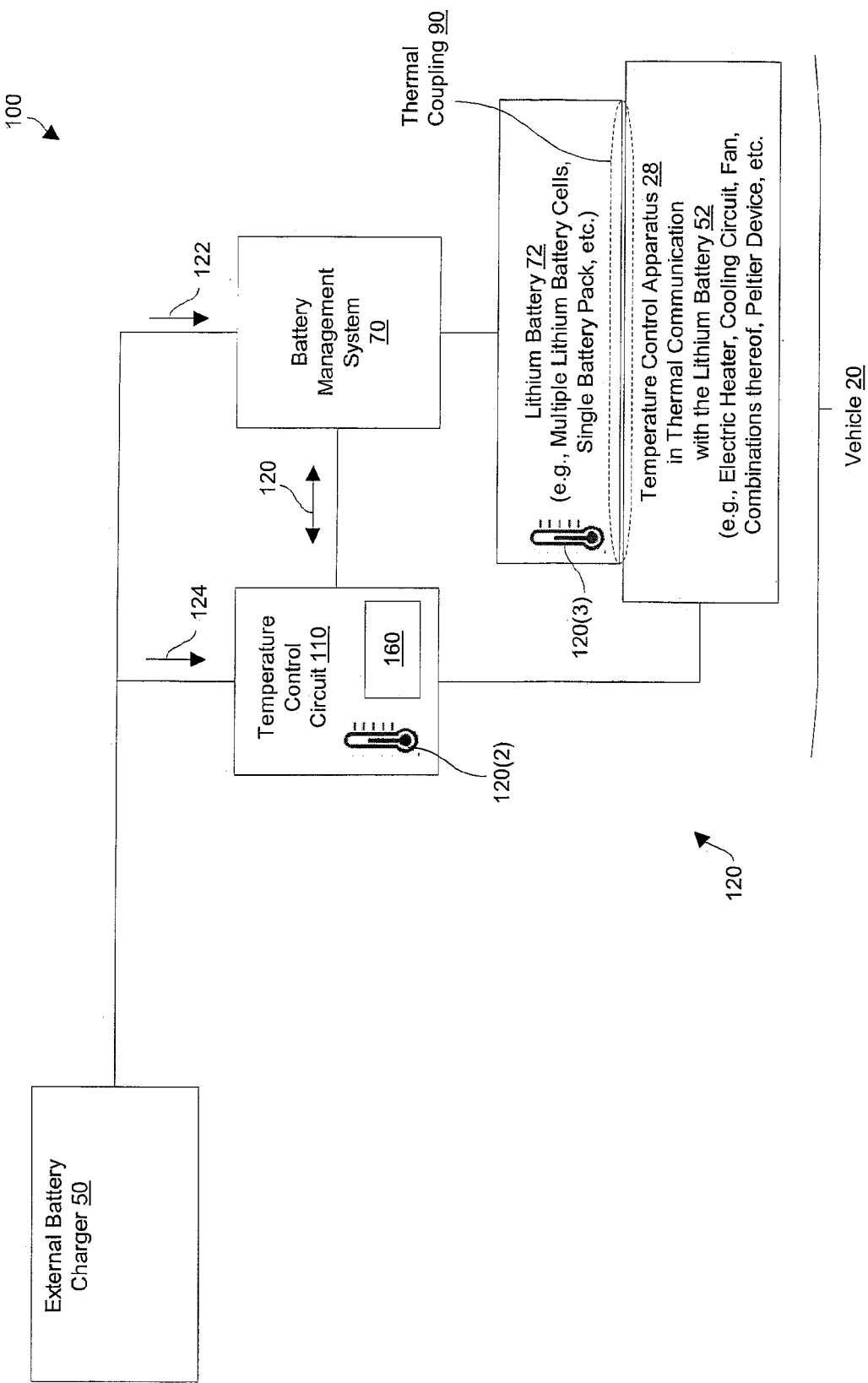
FIG. 4 is a block diagram of a first circuit configuration for performing temperature control in accordance with some example embodiments.
Figure 5:
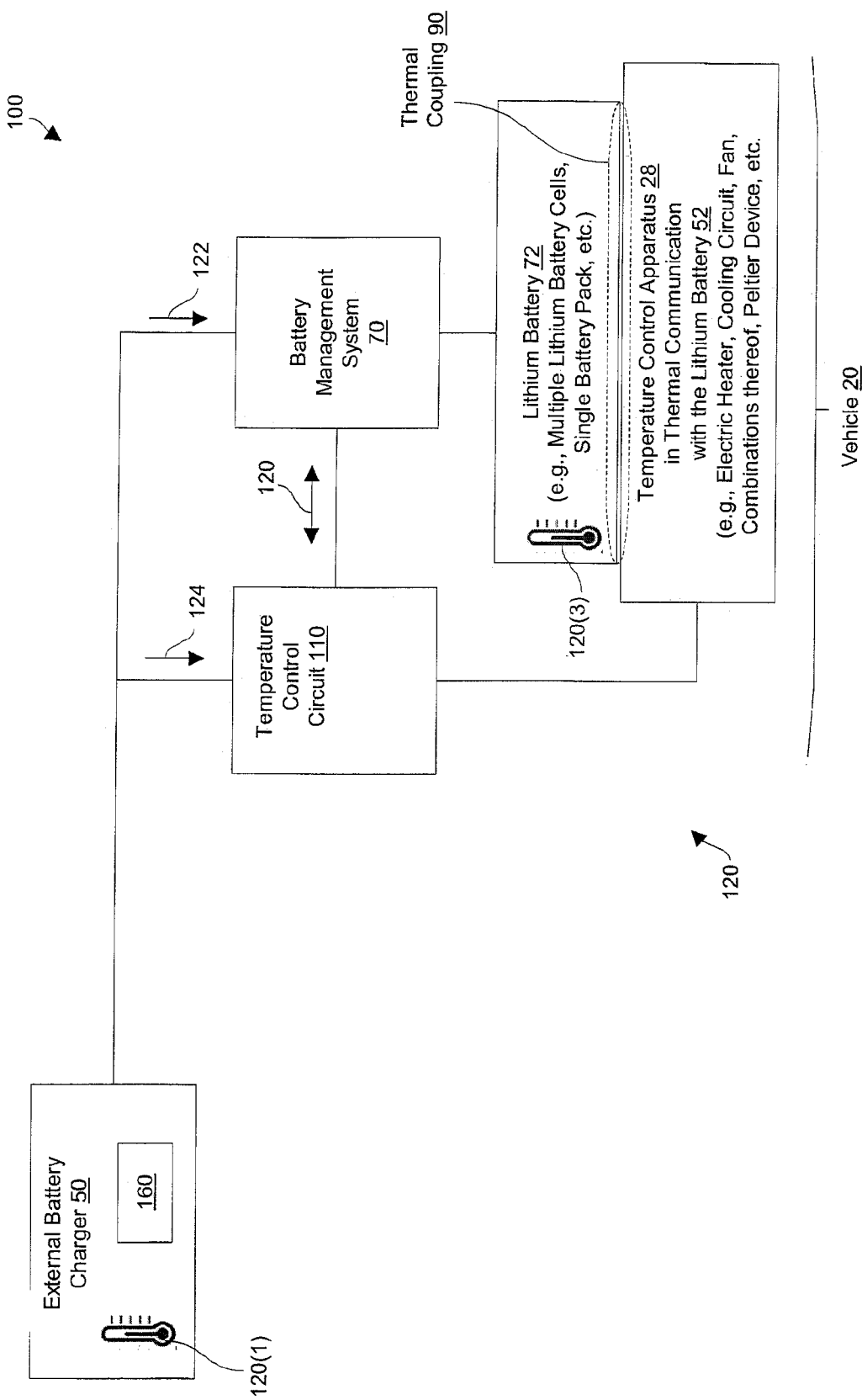
FIG. 5 is a block diagram of a second circuit configuration for performing temperature control in accordance with some example embodiments.

FIGS. 4 and 5 show different example circuit configurations for performing temperature control on the lithium battery 72 of the vehicle 20. FIG. 4 shows a first circuit configuration in which the specialized circuitry resides within the temperature controller 110 of the vehicle (also see FIG. 3). FIG. 5 shows a second circuit configuration in which the specialized circuitry resides within the external battery charger 50 connected to the vehicle (also see FIG. 3).

With reference to FIG. 4 and in accordance with a first circuit configuration, the temperature control circuit 110 includes the vehicle sensor 120(2) as well as the control circuitry 160 that performs a temperature control function on the lithium battery 72. The vehicle sensor 120(2) of the temperature control circuit 110 preferably resides at a location 120 which enables accurate temperature measurements reflective of the temperature of the lithium battery 72. For instance, if the vehicle sensor 120(2) resides next to or in a concealed location in a storage space shared by the lithium battery 72, the vehicle sensor 120(2) may provide relatively accurate readings of the temperature of the lithium battery 72 compared to those from a roof location that is adversely biased due to ice or heat from sunlight, wind, etc.

By way of example only, the control circuitry 160 of the temperature control circuit 110 may obtain an initial temperature reading from the vehicle sensor 120(2). If the initial temperature reading is within the target temperature range, the control circuitry 160 of the temperature control circuit 110 does not activate the temperature control apparatus 28. Rather, the control circuitry 160 maintains the temperature control apparatus 28 in an unpowered or deactivated state since the temperature reading indicates that the lithium battery 72 currently resides at a healthy temperature.

However, if the initial temperature reading is outside the target temperature range, the control circuitry 160 activates the temperature control apparatus 28 to move the current temperature of the lithium battery 72 to within the target temperature range. In particular, the control circuitry 160 provides power or activates the temperature control apparatus 28. In a situation in which the temperature control apparatus 28 provides selective heating and cooling, the control circuitry 160 selects (e.g., via an electric signal) whether the temperature control apparatus 28 provides heating or cooling to the lithium battery 72.

In some arrangements, the control circuitry 160 subsequently obtains temperature readings from the sensing circuitry 120(3) integrated within the lithium battery 72. Such subsequent temperature readings provide a feedback loop. In some arrangements, the control circuitry 160 may disable the temperature control apparatus 28 after the temperature readings from the sensing circuitry 120(3) pass a certain point. Such operation prevents the lithium battery 72 from overheating if the temperature control apparatus 28 is providing heat, or from becoming too cold if the temperature control apparatus 28 is providing cooling.

In some arrangements, the control circuitry 160 of the temperature control circuit 110 outputs electric power to the vehicle 20 continuously to enable temperature control so that the control circuitry 160 does not drain charge from the lithium battery 72. Such operation alleviates the need for the vehicle 20 to activate (or deactivate) the external battery charger 50.

In other arrangements, the external battery charger 50 does not need to constantly output electric power (see arrows 122 and 124 in FIG. 4). Rather, the cabling between the external battery charger 50 and the vehicle 20 may carry communications signals that enable the vehicle 20 to activate or deactivate a converter within the external battery charger 50. For example, if the BMS 70 has successfully charged the lithium battery 72 to a target level and there is no need to adjust the temperature of the lithium battery 72, the control circuitry 160 of the temperature control circuit 110 may direct the external battery charger 50 to deactivate its converter by sending a communication directly to the external battery charger 50 or indirectly through the BMS 70 (see the arrow 120 in FIG. 4).

Similarly, the control circuitry 160 may direct the external battery charger 50 to activate its converter in order to obtain access to electric power. For example, if the BMS 70 of the vehicle 20 is still awake but the lithium battery 72 has reached its target state of charge, the control circuitry 160 may still periodically check the current ambient temperature via the vehicle sensor 120(2) and, if the current ambient temperature strays outside the target temperature range, the control circuitry 160 may send a communication to the external battery charger 50 to turn on the converter.

In accordance with certain embodiments, one or more communications between the control circuitry 160 and the external battery charger 50 is wireless rather than over cabling. For example, the control circuitry 160 may be formed at least in part by a smart mobile device that is configured to wirelessly communicate with the external battery charger 50 directly or indirectly (e.g., over a wireless network and/or through other devices).

With reference to FIG. 5 and in accordance with a second circuit configuration, the external battery charger 50 includes the battery charger sensor 120(1) as well as the control circuit 160 that performs a temperature control function on the lithium battery 72. In this second configuration, the battery charger sensor 120(1) of the external battery charger 50 resides at a location which is close enough to the vehicle 20 to obtain accurate temperature measurements reflective of the temperature of the lithium battery 72. For instance, the battery charger sensor 120(1) may reside on a housing, a power cable, or a plug of the external battery charger 50. Here, the battery charger sensor 120(1) is close enough to the vehicle 20 and in a position that provides accurate battery temperature readings.

In this second circuit configuration, the control circuitry 160 may obtain an initial temperature reading from the battery charger sensor 120(1). If the initial temperature reading is within the target temperature range, the control circuitry 160 does not activate the temperature control apparatus 28. Rather, the control circuitry 160 maintains the temperature control apparatus 28 in an unpowered or deactivated state since the temperature reading indicates that the lithium battery 72 currently resides at a healthy temperature.

However, if the initial temperature reading is outside the target temperature range, the control circuitry 160 activates the temperature control apparatus 28 to move the current temperature of the lithium battery 72 to within the target temperature range. In particular, the control circuitry 160 sends a communication (e.g., a signal) to the temperature control circuit 110 (e.g., a contactor or relay) directing the temperature control circuit 110 to convey electric power (see the arrow 124) to the temperature control apparatus 28.

In a situation in which the temperature control apparatus 28 provides selective heating and cooling, the control circuitry 160 of the external battery charger 50 may select (e.g., via an electric signal to the temperature control circuit 110 or to the temperature control apparatus 28) whether the temperature control apparatus 28 provides heating or cooling to the lithium battery 72. For heat, the control circuitry 160 may activate a heating coil. For cooling, the control circuitry 160 may activate a Peltier device and/or a fan having access to cooler air. In certain embodiments, the electric power (see the arrow 122) may cause the BMS 70 to wake up and check whether the lithium battery 72 requires charging and, if necessary, recharge the lithium battery 72 before going back to sleep once the lithium battery 72 reaches a target state of charge.

In some arrangements, the control circuitry 160 subsequently obtains temperature readings from the sensing circuitry 120(3) integrated within the lithium battery 72. Such subsequent temperature readings provide a feedback loop. In some arrangements, the control circuitry 160 may disable the temperature control apparatus 28 after the temperature readings from the sensing circuitry 120(3) pass a certain point. Such operation prevents the lithium battery 72 from overheating if the temperature control apparatus 28 is providing heat, or from becoming too cold if the temperature control apparatus 28 is providing cooling.

In some arrangements, the external battery charger 50 does not need to constantly output electric power (see arrows 122 and 124 in FIG. 4). Rather, if the control circuitry 160 of the external battery charger 50 determines that the BMS 70 has successfully charged the lithium battery 72 to a target level and there is no need to adjust the temperature of the lithium battery 72, the control circuitry 160 of the external battery charger 50 deactivate its converter. Moreover, the external battery charger 50 may periodically provide electric power to enable the control circuitry 160 to perform a temperature check (i.e., assess whether heating or cooling is needed) so that there is no drain on the lithium battery 72.

Similarly, the control circuitry 160 may direct the external battery charger 50 to activate its converter in order to obtain access to electric power. For example, the control circuitry 160 may periodically check the current ambient temperature via the vehicle sensor 120(2) and, if the current ambient temperature strays outside the target temperature range, the control circuitry turn on the converter and direct the temperature control circuit 110 to convey electric power (see the arrow 124) to the temperature control apparatus 28 in order to bring the temperature of the lithium battery 72 within a healthier operating temperature.

In accordance with certain embodiments, one or more communications between the control circuitry 160 of the external battery charger 50 and the vehicle 20 is wireless. Such embodiments may alleviate the need for the power cable of the external battery charger 50 to further convey communications.

One should appreciate that other configurations are suitable for use as well to perform temperature control over the lithium battery 72 of the vehicle 20. For example, temperature sensing circuitry may reside in a distributed manner such as at all three locations 120, i.e., at the external battery charger 50 (see 120(1) in FIG. 3), at the temperature control circuit 110 (see 120(2) in FIG. 3), and at the lithium battery 72 (see 120(3) in FIG. 3). As another example, the temperature sensing circuitry may reside at only one location 120 such as only at the lithium battery 72 (see 120(3) in FIG. 3). Moreover, the temperature sensing circuitry may reside at locations 120 other than the above-listed locations 120 (e.g., on a floor, wall or ceiling of an enclosed charging area, in a separate device of the vehicle, etc.).

Moreover, one should appreciate that the temperature control function may be performed at locations 120 other than the vehicle 20 or the external battery charger 50. In some embodiments such as facility that manages a fleet of utility vehicles, there may be a central server that receives periodic status (including ambient temperature) from multiple vehicles 20 and imposes temperature control over the lithium batteries 72 of all of the vehicles 20 simultaneously, individually and/or in groups.

In accordance with certain embodiments, the BMS 70 is configured to power down (e.g., go to sleep) to preserve battery state of charge in response to certain events (e.g., when the lithium battery 72 charges to a target level). In certain arrangements, temperature monitoring occurs at the external battery charger 50 since there is no charge consumption constraint on the external battery charger 50 (e.g., continuously, periodically, etc.). Then, if the external battery charger 50 determines that the temperature of the lithium battery 72 should be adjusted, the external battery charger 50 outputs power to the vehicle 20 to power the temperature control apparatus 28. In some arrangements, such operation may wake up the BMS 70 which may then check the state of charge of the lithium battery 72 and either provide charge to the lithium battery 72 if needed or power down if not needed.

In other arrangements again in which the BMS 70 powers down, temperature sensing may still occur on the vehicle 20 (where there may be greater confidence in the accuracy of the temperature readings). For example, the external battery charger 50 may periodically provide power to the vehicle 20 to activate (or wake up) temperature sensing on the vehicle 20. After temperature is sensed, if the temperature control function on the vehicle 20 determines that the temperature of the lithium battery 72 should be adjusted, the temperature control function conveys power from the external battery charger 50 to the temperature control apparatus 28 to adjust the temperature of the lithium battery 72. In some arrangements, such operation may also wake up the BMS 70 which may then check the state of charge of the lithium battery 72 and either provide charge to the lithium battery 72 if needed or power down if not needed. Further details will now be provided with reference to FIG. 6.

Figure 6:
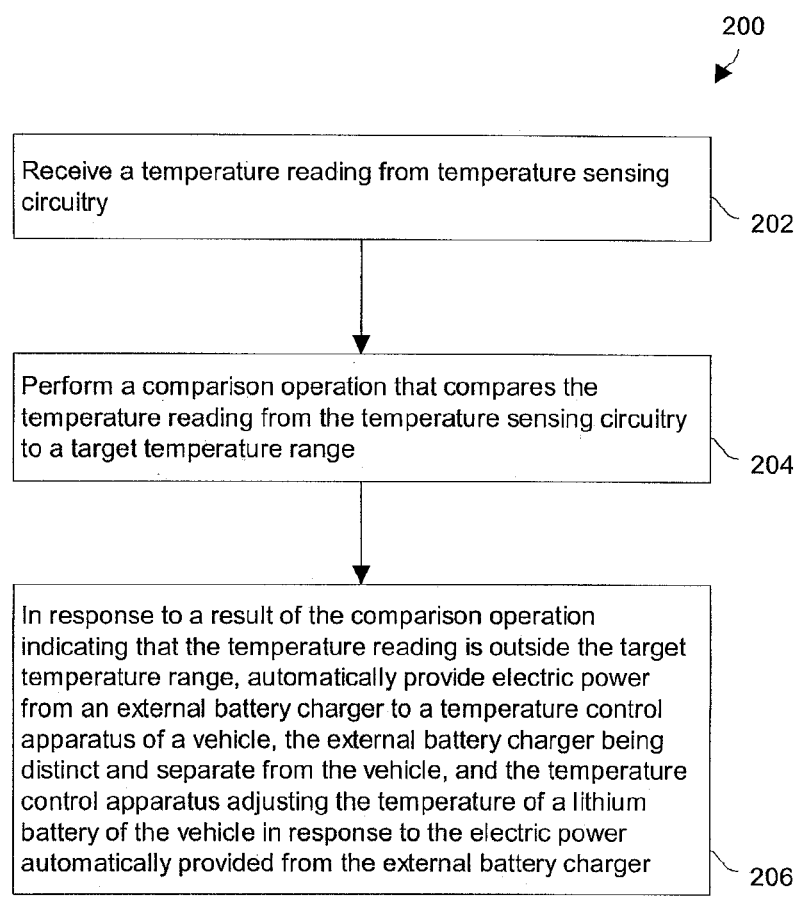
FIG. 6 is a flowchart of a procedure which is performed by the particular circuitry of FIG. 2 in accordance with some example embodiments.

FIG. 6 is a flowchart of a procedure 200 which is performed by specialized circuitry to control the temperature of a lithium battery of a vehicle using electric power from an external battery charger. Such a procedure 220 is well suited for a utility vehicle such as a golf car which is recharged by the same external battery charger (also see FIG. 1).

At 202, the specialized circuitry receives a temperature reading from temperature sensing circuitry. The source of this temperature reading may be a sensor of the external battery charger, a sensor of the vehicle, or even sensing circuitry of the lithium battery.

At 204, the specialized circuitry performs a comparison operation that compares the temperature reading from the temperature sensing circuitry to a target temperature range. In some arrangements, the specialized circuitry may use a first target temperature range to determine whether to activate temperature control, and a second target temperature range that is different than the first target temperature range to determine whether to deactivate temperature control.

At 206, the specialized circuitry, in response to a result of the comparison operation indicating that the temperature reading is outside the target temperature range, automatically provides electric power from an external battery charger to the temperature control apparatus of the utility vehicle. As mentioned earlier, the external battery charger is distinct and separate from the utility vehicle. Additionally, the temperature control apparatus adjusts the temperature of the lithium battery of the utility vehicle in response to the electric power automatically provided from the external battery charger.

As described above, improved techniques are directed to performing temperature control on a lithium battery 72 of a vehicle 20. In particular, a temperature control apparatus 28 which is in thermal communication with the lithium battery 72 receives electric power 124 from an external battery charger 50 to adjust the temperature of the lithium battery 72 when the ambient temperature is outside a target temperature range (e.g., when the ambient temperature is suboptimal). Accordingly, when a user later initiates operation of the vehicle 20, the temperature of the lithium battery 72 will have been adjusted from the ambient temperature to a better suited temperature. Along these lines, in a cold temperature environment, the temperature of the lithium battery 72 may be raised (e.g., using an electric heater powered by the external battery charger) so that performance of the lithium battery 72 is not diminished and the user is able to operate the vehicle 20 with greater battery capacity. Additionally, in a high temperature environment, the temperature of the lithium battery 72 may be lowered (e.g., using cooling circuitry powered by the external battery charger) to preserve the life of the lithium battery 72.

While various embodiments of the present disclosure have been particularly shown and described, it will be understood by those skilled in the art that various changes in form and details may be made therein without departing from the spirit and scope of the present disclosure as defined by the appended claims.

One should appreciate that lithium ion battery systems in vehicle applications may be subjected to extremes in temperature. At these temperature extremes, the performance of lithium ion batteries is diminished. In particular, in low ambient temperatures, battery capacity is reduced. Additionally, in very low ambient temperatures, lithium ion batteries are not capable of recharge. Furthermore, in very high ambient temperatures, the life of lithium ion batteries is reduced.

One approach to address this issue may be to perform temperature control in a lithium ion powered vehicle using a warming element or a cooling element that is either powered by the lithium ion battery itself or powered by an internal combustion engine generator on a hybrid vehicle. However, such an approach consumes vehicle power.

An alternative approach may be to use an auxiliary system powered independently via an AC utility outlet. However, it may be overly complicated as well as dangerous to provide AC power signals from the AC utility outlet to a vehicle that uses DC signals for operation.

However, in accordance with certain embodiments, degradation of lithium ion battery performance at extremes in temperature is minimized by providing a system for warming and/or cooling lithium ion batteries, depending on the ambient temperature conditions. In certain embodiments, the battery charger monitors ambient temperature while connected to a vehicle and utility outlet for charging/storage. When ambient temperatures are not ideal for lithium ion batteries (e.g., outside a target temperature range), the battery charger provides DC power to the vehicle for warming or cooling the lithium ion batteries. Once the lithium ion batteries reach an adequate temperature, the battery charger provides DC power for charging, if required, or continues to provide DC power, as needed, to maintain the battery temperature within the desired range.

Example mechanisms for warming the batteries include devices such as resistive/PTC (positive temperature coefficient) elements, Peltier devices, and the like. Example mechanisms for cooling the batteries include devices such as fans (e.g., that can access a cooler air source), Peltier devices, and the like. The control of the warming/cooling devices can be accomplished by the battery management system (BMS), a fleet management system, a tractive motor controller of the vehicle, a vehicle systems controller, a combination of some or all of these devices, and so on. In some arrangements, the control may also be a stand-alone control system. In other arrangements, the control may leverage processing circuitry that performs additional functions.

In accordance with certain embodiments, the battery management systems of lithium ion battery packs routinely cut power during periods of non-use to preserve the battery pack state of charge. Due to this power down, the vehicle itself may not be able to monitor battery or ambient temperatures that may be diminishing or damaging to the lithium ion battery cells without risking over-depleting the charge of the lithium ion battery cells. The battery charger, however, is typically powered by an AC connection and connected to the vehicle when not in use. Given that the battery charger is powered by the AC connection, the battery charger can monitor ambient temperature while the vehicle electronics are in a powered-down state. Should an undesirable ambient temperature be detected, the battery charger can then power the vehicle electronics via the DC power output (normally used for battery charging). This DC power output can provide a wake-up signal for the vehicle electronics plus provide power for either warming or cooling the lithium ion battery cells to a more desirable temperature and then continue to provide power to maintain temperature as needed.

One should appreciate that the battery charger is uniquely employed to provide lithium battery temperature control. That is, normally the battery charger provides power for battery charging. In addition to this function, the battery charger is further used as a device for monitoring ambient temperatures when connected to a vehicle during storage. When undesirable ambient temperatures are detected by the battery charger, the battery charger provides DC power for the additional purpose of warming or cooling the battery system.

On the vehicle itself, a temperature control function may be employed that serves to direct the DC Power from the battery charger to devices for warming/cooling the battery pack accordingly. These devices for warming and/or cooling can be elements such as resistive, PTC, Peltier, circulating fans, etc. The temperature control function could be incorporated into one of many existing controllers such as the BMS, the motor controller, the fleet management system, the vehicle systems controller, or could be a standalone controller.

Additionally, the temperature control function can be further enhanced by connection to the vehicle CAN bus network if equipped. That is, other systems such as the BMS and the motor controller may already be configured to communicate in this matter thus enabling a straight forward path to tying in the additional temperature control function.

It should be understood that the vehicle may have been described above in the context of a golf car. It should be understood that various types of vehicles and/or applications are suitable for use such as automotive, agricultural applications, military systems and products employing lithium ion battery systems, and so on. Such modifications and enhancements are intended to belong to various embodiments of the disclosure.

What is claimed is:

1. For a utility vehicle having a lithium battery and a temperature control apparatus, a method of performing temperature control on the lithium battery, the method comprising:
receiving a temperature reading from temperature sensing circuitry;
performing a comparison operation that compares the temperature reading from the temperature sensing circuitry to a target temperature range; and
in response to a result of the comparison operation indicating that the temperature reading is outside the target temperature range, automatically providing electric power from an external battery charger to the temperature control apparatus of the utility vehicle, the external battery charger being distinct and separate from the utility vehicle, and the temperature control apparatus adjusting the temperature of the lithium battery of the utility vehicle in response to the electric power automatically provided from the external battery charger;
wherein the temperature sensing circuitry includes a battery charger sensor of the external battery charger; and
wherein receiving the temperature reading from the temperature sensing circuitry includes:
acquiring a sensor signal from the battery charger sensor, the sensor signal identifying, as the temperature reading, an ambient temperature of the external battery charger.

2. A method as in claim 1 wherein the external battery charger includes a converter which is interconnected between an external power source and the temperature control apparatus of the utility vehicle; and
wherein automatically providing the electric power from the external battery charger to the temperature control apparatus of the utility vehicle includes:
while the converter converts a first power signal from the external power source to a second power signal, delivering the second power signal from the converter to the temperature control apparatus of the utility vehicle.

3. A method as in claim 2, further comprising:
delivering the second power signal from the converter to the lithium battery of the utility vehicle to recharge the lithium battery.

4. A method as in claim 3 wherein delivering the second power signal from the converter to the temperature control apparatus of the utility vehicle includes:
after the delivery of the second power signal from the converter to the lithium battery of the utility vehicle has been terminated in response to the lithium battery reaching a target state of charge, supplying the second power signal from the converter to the temperature control apparatus of the utility vehicle to modify the temperature of the lithium battery.

5. A method as in claim 4 wherein delivering the second power signal from the converter to the temperature control apparatus of the utility vehicle further includes:
during the delivery of the second power signal from the converter to the lithium battery of the utility vehicle, supplying the second power signal from the converter to the temperature control apparatus of the utility vehicle to modify the temperature of the lithium battery.

6. A method as in claim 4 wherein the temperature sensing circuitry further includes a vehicle sensor of the utility vehicle; and wherein receiving the temperature reading from the temperature sensing circuitry includes:
acquiring a sensor signal from the vehicle sensor, the sensor signal identifying, as the temperature reading, an ambient temperature of the utility vehicle.

7. A method as in claim 4 wherein the temperature sensing circuitry further includes cell sensing circuitry of the lithium battery; and
wherein receiving the temperature reading from the temperature sensing circuitry includes:
acquiring a sensor signal from the cell sensing circuitry of the lithium battery, the sensor signal identifying, as the temperature reading, cell temperature of the lithium battery.

8. A method as in claim 7 wherein the temperature sensing circuitry further includes external sensing circuitry which is distinct and separate from the lithium battery; and
wherein the method further comprises:
prior to acquiring the sensor signal from the cell sensing circuitry of the lithium battery, (i) acquiring a temperature measurement from the external sensing circuitry and (ii) in response to the temperature measurement being outside a predefined threshold of the target temperature range, transitioning the converter of the external battery charger from an inactive state in which the converter does not convert the first power signal from the external power source to the second power signal to an active state in which the converter converts the first power signal from the external power source to the second power signal.

9. A method as in claim 4 wherein the temperature control apparatus includes an electric heater;
wherein the result of the comparison operation indicates that the temperature reading is lower than the target temperature range; and
wherein delivering the second power signal from the converter to the temperature control apparatus of the utility vehicle includes:
in response to the result of the comparison operation indicating that the temperature reading is lower than the target temperature range, supplying the second power signal to the electric heater to provide heat to the lithium battery.

10. A method as in claim 4 wherein the temperature control apparatus includes an electric cooling circuit;
wherein the result of the comparison operation indicates that the temperature reading is higher than the target temperature range; and
wherein delivering the second power signal from the converter to the temperature control apparatus of the utility vehicle includes:
in response to the result of the comparison operation indicating that the temperature reading is higher than the target temperature range, supplying the second power signal to the electric cooling circuit to cool the lithium battery.

11. A method as in claim 4 wherein the temperature control apparatus includes heating and cooling circuitry;
wherein the result of the comparison operation indicates that the temperature reading is lower than the target temperature range; and
wherein the method further comprises:
in response to the result of the comparison operation indicating that the temperature reading is lower than the target temperature range, providing a control signal to the heating and cooling circuitry that directs the heating and cooling circuitry to provide heat to the lithium battery.

12. A method as in claim 4 wherein the temperature control apparatus includes heating and cooling circuitry;
wherein the result of the comparison operation indicates that the temperature reading is higher than the target temperature range; and
wherein the method further comprises:
in response to the result of the comparison operation indicating that the temperature reading is higher than the target temperature range, providing a control signal to the heating and cooling circuitry that directs the heating and cooling circuitry to cool the lithium battery.

13. A method as in claim 4 wherein the external battery charger includes a control circuit that is powered by the external power source; and
wherein performing the comparison operation that compares the temperature reading from the temperature sensing circuitry to the target temperature range includes:
generating, by the control circuit of the external battery charger, the result indicating that the temperature reading is outside the target temperature range.

14. A method as in claim 4 wherein the utility vehicle includes a control circuit that is powered by the external power source; and
wherein performing the comparison operation that compares the temperature reading from the temperature sensing circuitry to the target temperature range includes:
generating, by the control circuit of the utility vehicle, the result indicating that the temperature reading is outside the target temperature range.

15. A utility vehicle, comprising:
a utility vehicle body;
a set of electrical loads supported by the utility vehicle body;
a lithium battery supported by the utility vehicle body and being constructed and arranged to electrically power the set of electrical loads;
a temperature control apparatus thermally coupled to the lithium battery; and
a controller electrically coupled to the temperature control apparatus, the controller being constructed and arranged to:
obtain a temperature reading from temperature sensing circuitry,
perform a comparison operation that compares the temperature reading to a target temperature range, and
in response to a result of the comparison operation indicating that the temperature reading is outside the target temperature range, automatically provide electric power from an external battery charger to the temperature control apparatus, the external battery charger being distinct and separate from the utility vehicle, and the temperature control apparatus adjusting the temperature of the lithium battery in response to the electric power automatically provided from the external battery charger;
wherein the temperature sensing circuitry includes a battery charger sensor of the external battery charger; and
wherein receiving the temperature reading from the temperature sensing circuitry includes:

acquiring a sensor signal from the battery charger sensor, the sensor signal identifying, as the temperature reading, an ambient temperature of the external battery charger.

16. A utility vehicle as in claim 15 wherein the controller is further constructed and arranged to:
connect the lithium battery to the external battery charger to recharge the lithium battery.

17. A battery charger that charges a lithium battery of a utility vehicle, the charger comprising:
a converter constructed and arranged to convert a first power signal from an external power source to a second power signal which is suitable for charging the lithium battery of the utility vehicle;
a set of cables constructed and arranged to connect to the utility vehicle;
temperature sensing circuitry; and
a control circuit coupled to the converter and the temperature sensing circuitry, the control circuit being constructed and arranged to:
obtain a temperature reading from the temperature sensing circuitry,
perform a comparison operation that compares the temperature reading to a target temperature range, and
in response to a result of the comparison operation indicating that the temperature reading is outside the target temperature range, automatically provide the second power signal from the converter to a temperature control apparatus of the utility vehicle through the set of cables, the battery charger being distinct and separate from the utility vehicle, and the temperature control apparatus adjusting the temperature of the lithium battery in response to the second power signal automatically provided from the converter;
wherein the temperature sensing circuitry includes a battery charger sensor; and
wherein obtaining the temperature reading from the temperature sensing circuitry includes:
acquiring a sensor signal from the battery charger sensor, the sensor signal identifying, as the temperature reading, an ambient temperature of the battery charger.

18. A method as in claim 1 wherein the target temperature range is defined by a low end and a high end; and
wherein performing the comparison operation includes:
generating, as the result of the comparison operation, a result indicating whether the temperature reading is (i) concurrently below the high end and above the low end, or (ii) not concurrently below the high end and above the low end.

19. A method as in claim 1, further comprising:
continuing to provide electric power from the external battery charger to the temperature control apparatus after the temperature of the lithium battery moves from being outside the target temperature range to within the target temperature range, and
terminating delivery of electric power from the external battery charger to the temperature control apparatus when the temperature of the lithium battery reaches a particular point within the target temperature range.

* * * * *